(12) United States Patent
Barnum

(10) Patent No.: US 7,375,675 B2
(45) Date of Patent: May 20, 2008

(54) METHOD AND SYSTEM FOR MULTIPLE TARGET CLASS DATA RECORDING, PROCESSING AND DISPLAY FOR OVER-THE-HORIZON RADAR

(75) Inventor: James R. Barnum, Mountain View, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 10/598,883

(22) PCT Filed: Mar. 30, 2005

(86) PCT No.: PCT/US2005/010832

§ 371 (c)(1),
(2), (4) Date: Sep. 14, 2006

(87) PCT Pub. No.: WO2006/075992

PCT Pub. Date: Jul. 20, 2006

(65) Prior Publication Data

US 2007/0273574 A1 Nov. 29, 2007

Related U.S. Application Data

(60) Provisional application No. 60/559,999, filed on Apr. 5, 2004.

(51) Int. Cl.
*G01S 7/40* (2006.01)
*G01S 13/66* (2006.01)

(52) U.S. Cl. .................. 342/90; 342/96; 342/126; 342/140; 342/146

(58) Field of Classification Search ............... 342/90, 342/95–97, 107, 108, 113, 125, 126, 133, 342/139, 140, 145–147, 189
See application file for complete search history.

(56) References Cited

U.S. PATENT DOCUMENTS

| | | | | |
|---|---|---|---|---|
| 4,077,038 A * | 2/1978 | Heller et al. | ................. | 342/92 |
| 4,456,982 A * | 6/1984 | Tournois | ................. | 367/11 |
| 4,593,286 A * | 6/1986 | Mathews et al. | ................. | 342/88 |
| 4,720,711 A * | 1/1988 | Quesinberry et al. | ................. | 342/96 |
| 5,334,985 A * | 8/1994 | Tucker et al. | ................. | 342/176 |
| 6,211,816 B1 * | 4/2001 | Westphal | ................. | 342/357.03 |
| 6,373,426 B1 * | 4/2002 | Hellsten | ................. | 342/59 |
| 7,199,750 B2 * | 4/2007 | Bourdelais et al. | ................. | 342/90 |
| 2007/0273574 A1 * | 11/2007 | Barnum | ................. | 342/90 |

* cited by examiner

*Primary Examiner*—John B Sotomayor
(74) *Attorney, Agent, or Firm*—Guerin & Rodriguez, LLP; Willaim G. Guerin

(57) ABSTRACT

A method and apparatus are disclosed that enable an over-the-horizon-radar (OTHR) system to detect and track multiple target classes simultaneously, where target classes are defined by the speed and acceleration of the tracked objects. The OTHR is tasked in a staring mode, with a bandwidth and waveform repetition frequency that enable detection of Doppler shifts from all target types, with sufficient clutter reduction and range resolution. The backscattered echoes are buffered for each target class and processed independently. The output of an automatic tracking algorithm then preferentially plots target progress on a single digital map for all target classes.

16 Claims, 5 Drawing Sheets

METHOD AND SYSTEM FOR MULTIPLE TARGET CLASS DATA RECORDING, PROCESSING AND DISPLAY FOR OVER-THE-HORIZON RADAR

RELATED APPLICATION

This application claims the benefit of the filing date of U.S. Provisional Application Ser. No. 60/559,999, filed Apr. 5, 2004, titled "Method and Apparatus for Multiple Target Class Data Recording, Processing and Display for Over the Horizon Radar," the entirety of which provisional application is incorporated by reference herein.

FIELD OF THE INVENTION

The invention relates to over-the-horizon-radar (OTHR). More specifically, the invention features a method and system for enabling OTHR to simultaneously track targets in multiple target classes.

BACKGROUND OF THE INVENTION

OTHR is a well established and economical, long-range, wide-area surveillance sensor technology. OTHR propagates high-frequency (HF) energy via the ionosphere to detect targets at distances of roughly 400 to 2,000 nautical miles (nmi) from the radar, within azimuthal sectors up to 90° wide. Operational OTHRs have been deployed at various locations in the United States and Australia for target detection applications, and the underlying technology is described in the literature of the art, for example, in J. M. Headrick and M. I. Skolnik, "Over-the-Horizon Radar in the HF Band," Proc. IEEE, vol. 62, no. 6, pp. 664-673, 1974; T. W. Washburn, L. E. Sweeney, Jr., J. R. Barnum, and W. B. Zavoli, "Development of HF Skywave Radar for Remote Sensing Applications," in AGARD Conf. Proc. No. 263, Special Topics in HF Propagation, V. J. Coyne, Ed. London, England: Tech. Editing and Reproductions, 1979, Ch. 32.; and James R. Barnum, "Ship Detection with High-Resolution HF Skywave Radar," IEEE Jour. Oceanic Engineering., Vol. OE-11, No. 2, pp. 196-209, April 1986.

Current OTHRs deal separately with targets found in different target classes, where the target classes are defined by differing speeds and accelerations. The development of OTHR, directed at one new target class after another, has spawned unique methods for radar operation and signal processing to achieve optimal results for each target class. For example, the radar system is configured with short dwell periods for fast targets. Conversely, the radar system is configured with long dwell periods for slow targets that compete with stochastic earth clutter. Although the target application or "mode" can be switched rapidly, a deployment scenario involving detection of slow targets can preclude detection of faster targets, and vice versa. Moreover, some medium speed target detection modes have a target refresh rate that is too slow to acquire and identify high speed, high acceleration targets.

The OTHR development community has long recognized the limitation imposed by differing radar requirements for each target class. The solution of mode switching described above results in reduced capability. Another proposed solution to utilize multiple radar systems can be prohibitively expensive.

What is needed is a method and system to enable simultaneous detection and tracking of targets in multiple target classes by a single OTHR installation.

SUMMARY OF THE INVENTION

In one aspect, the invention features a method for detecting targets in a plurality of target classes. An OTHR is configured in a staring mode to monitor an area of interest. A radar beam is transmitted on a fixed bearing to illuminate an area of interest. The radar beam has a fixed bandwidth and a fixed waveform repetition frequency (WRF). Radar backscattered energy from the area of interest is received and pre-processed to generate radar data which is stored in a plurality of buffers. The buffered radar data is processed in parallel channels to determine positions of targets present in the area of interest. Each channel corresponds to a respective one of the target classes.

In another aspect, the invention features an OTHR system for detecting and tracking targets in a plurality of target classes. The OTHR system includes a transmitter, a receiver, a plurality of buffers and a plurality of processors. The transmitter illuminates an area of interest. The receiver has a plurality of receive beams to detect backscattered energy from the area of interest. The receiver pre-processes the detected backscattered energy to generate pre-processed radar data. Each buffer is in communication with the receiver and is adapted to store the pre-processed radar data. Each processor is in communication with a respective one of the buffers and is adapted to process the pre-processed radar data for a respective one of the target classes and provide class-specific target data.

In another aspect, the invention features a computer program product for detecting targets in a plurality of target classes. The computer program product includes a computer useable medium having embodied therein program code, including program code for pre-processing radar energy from an area of interest and generating radar data in response to the pre-processed radar energy. The radar energy is backscattered energy from an illumination of the area of interest by an over-the-horizon radar beam having a fixed bandwidth and a fixed WRF. The program code of the computer useable medium also includes program code for storing the radar data in a plurality of buffers and program code for simultaneously processing the buffered radar data in parallel channels to determine positions of targets present in the area of interest. Each channel corresponds to a respective one of the target classes. In one embodiment, the program code for simultaneously processing the buffered data in parallel channels includes a plurality of program code modules adapted for simultaneous execution. Each program code module includes program code for processing the buffered radar data in a respective buffer to determine positions of targets present in the area of interest for a respective one of the target classes.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

Modern counternarcotic, counterterrorism, and similar early-warning attack threat scenarios emphasize the need for radar acquisition and simultaneous tracking of diverse target types. OTHR systems are the only wide-area sensors capable of remote detection and tracking of all target classes. However, conventional OTHR systems are limited to detecting targets belonging to only one target class at a time. Restricting detection and tracking to only one target class can result in missed detection of targets in one or more other target classes. For example, for targets in the 50-500 m/s range, radar dwells are relatively short (e.g., 2-4 s), so that target updates are acquired more frequently to facilitate tracking, and Doppler smearing due to acceleration and speed fluctuations is minimized. These short dwells are typically updated no more than once per second. Very fast targets (e.g., 500-1000 m/s) with high accelerations, however, require more frequent target updates (e.g., 0.25 to 0.5 s) for detection and tracking. Conversely, slow targets (0-50 m/s), are detected and tracked in the earth clutter echo, and therefore require longer radar dwells (e.g., 25 s).

The present invention features a method and system that enable OTHR to simultaneously detect and track targets from multiple target classes. The OTHR system is tasked in a staring mode, with a bandwidth and WRF that enable detection of Doppler shifts from all target types, with sufficient clutter reduction and range resolution. The radar backscattered energy is pre-processed. The resulting digital data is buffered for each target class and subsequent processing is performed independently. The output of an automatic tracking algorithm then preferentially plots target progress on a single digital map for all target classes. Consequently, the risk of missing a target detection in one or more of the target classes is substantially reduced. The multiple target class processing of the present invention also enables accurate computation of intertarget vectors as the ionospheric conditions are the same for each target.

Over the Horizon Radar

Figure 1:
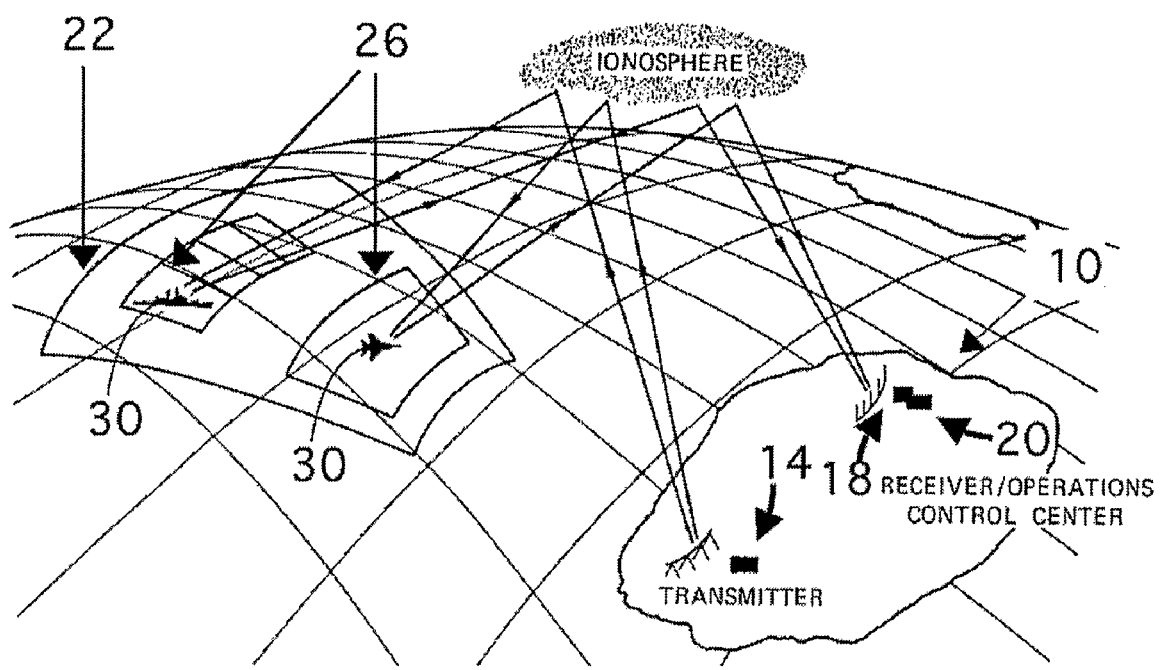
FIG. 1 is a diagram depicting the geometry associated with a typical OTHR deployment.

FIG. 1 depicts the geometry of a typical OTHR system 10. The transmit site 14 and receive site 18 are separated by 50 to 100 nmi to provide isolation during the use of continuous waveforms, such as a frequency-modulated continuous-wave (FMCW) waveform. The transmit and receive sites 14, 18 are both controlled by an Operations and Control Center (OCC) 20, which is preferentially located at the receiver site 18. By means of a midpath ionospheric reflection, the radar system 10 is able to access a coverage area that is depicted by the larger sector 22, which is called the "primary coverage area" (PCA). The sector 22 is typically 64° wide (with a practical maximum of 90° with the use of broadside antenna arrays) and ranges from approximately 400 nmi to as much as 2,000 nmi from the radar 10.

Operations at single radio frequencies are concentrated in "dwell-illuminated regions" (DIRs), as depicted by the smaller sectors 26 containing targets 30. As used herein, the phrase "area of interest" generally means an area equivalent to or contained within a DIR 26. A radar dwell is defined herein as the time required to sample a specific DIR 26 (e.g., 100 nmi in azimuth and 200 nmi in range). A typical OTHR defines a dwell for a single coherent integration time (CIT), which encompasses 16 parallel finger beams spaced nominally by 0.5°. An alternate DIR embodiment consists of 5 parallel finger beams spaced by 0.5°. Thus, a DIR 26 consists of multiple smaller "resolution cells" with dimensions proportional to the antenna beamwidth and range resolution of the radar 10. Each resolution cell typically measures on the order of 10×10 nmi, although the range dimension in some instances can be significantly smaller. Target detections within a DIR 26 are filtered and smoothed in time by an automatic tracker, and the detections are registered using an on-line ionospheric model, to enable positioning accuracy often better than the dimensions of a resolution cell. As shown in the figure, the OTHR 10 is a "look-down" radar, with elevation angles on the order of 5° to 20°, which mitigates the problem of target shadowing during terrain following maneuvers in mountainous canyons.

Figure 2:
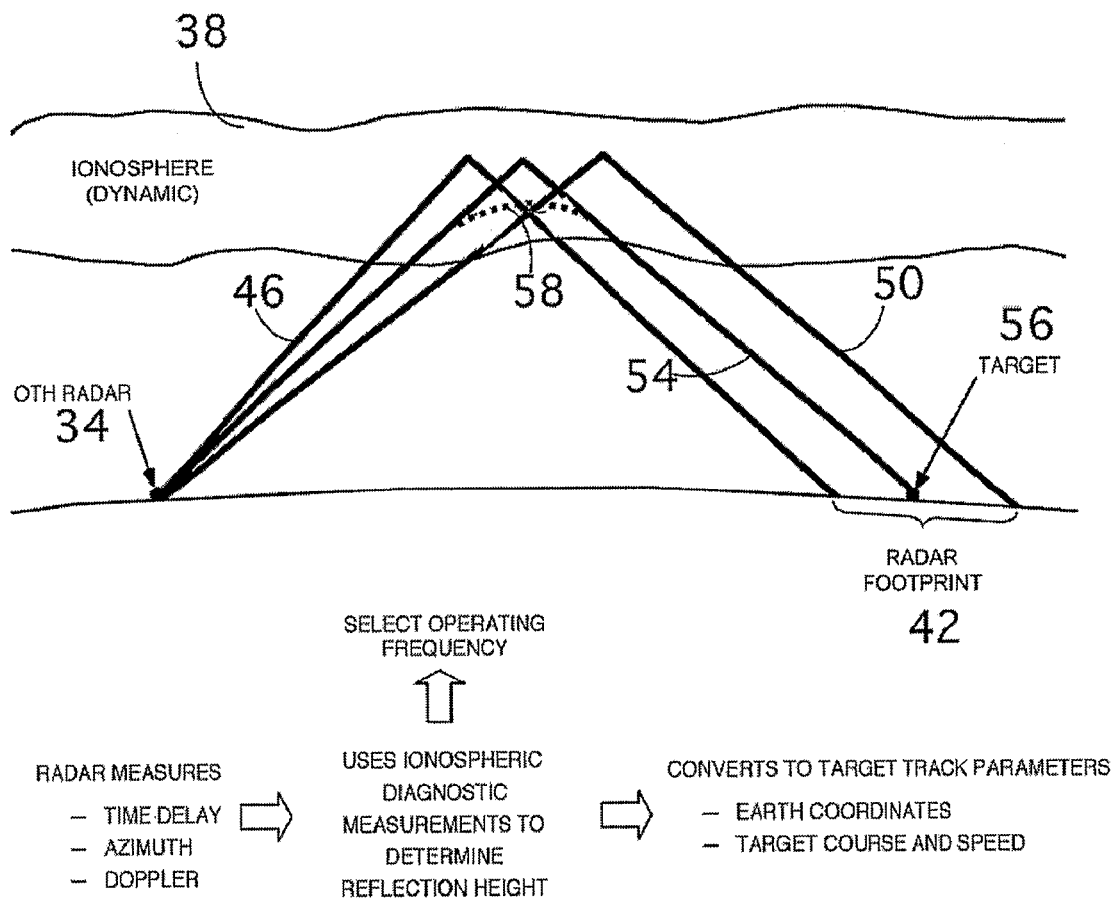
FIG. 2 is a schematic diagram of OTHR propagation.

A two-dimensional schematic of propagation for an OTHR system 34 is shown in FIG. 2. For simplicity, the propagation path is shown in a monostatic configuration. In a bistatic radar configuration, the differences in the transmit and receive paths are accommodated by the radar's tracking system. The OTHR system 34 constantly sounds the ionosphere 38, both directly over the OTHR system 34 by means of a quasi-vertical ionogram (QVI) and out to target distances with the wide-sweep backscatter ionogram (WSBI). The soundings are part of a Propagation Management and Assessment (PMA) function utilized by the OTHR system 34. The soundings are used to update an on-line ionospheric model that provides the OTHR system 34 with the available ionospheric layers, modes, and radio frequencies for operation. The transmit radar beam illuminates a desired footprint location 42 (i.e., DIR) at a single frequency computed from an on-line ionospheric model. Radar paths 46 and 50 to the near and far ends, respectively, of the DIR 42 are depicted as perfect triangles, with an apex at the path "virtual height." A triangle path 54 to the center of the DIR 42 is used as the basis for estimating ionospheric height in the PMA function for all targets 56 in the DIR 42. The transmit and receive radar paths actually refract gently through the ionosphere, as depicted by the dashed line 58. Martyn's Equivalent Path Theorem (circa 1935) (see K. Davies, "*Ionospheric Radio*", Peter Peregrinus Ltd., London, 1989), with a correction for curved ionosphere, discloses the equivalent triangle concept and computation of the propagation time delay assuming free space propagation. Ionospheric tilts caused by horizontal variations in electron density in the ionosphere generally cause only minor modifications to the propagation paths. The variations in virtual height across the DIR 42 are also typically small and can be accounted for in radar processing functions, if necessary.

Radar energy is backscattered from the ground, targets 56, meteors exploding in the ionosphere, and occasionally from dynamic irregularities in the ionosphere 38. The ground backscatter constitutes the majority of radar clutter, which is normally at least 30 to 70 dB stronger than an aircraft target in any range-azimuth cell. The targets 56 are separated from the clutter and detected against the much weaker atmospheric noise level using Doppler processing. This processing takes advantage of the change in radar frequency caused by a moving target. The frequency is decreased if the target 56 is moving away from the radar transmitter. Conversely, the frequency is increased if the target 56 is approaching the radar transmitter. Doppler processing also reduces the amplitude of occasional random backscatter from moving ionospheric irregularities, called "spread clutter," as disclosed by Lucas, Pinson, and Pilon in "*Some Results of RADARC-2 Equatorial Spread Doppler Clutter Predictions*", Proc. $7^{th}$ International Ionospheric Effects Symposium, 1993.

A routine characterization of radar performance referred to as the sub-clutter visibility (SCV) is defined as the ratio of average land or sea clutter amplitude to the average noise power. For example, a median SCV of 50 dB or greater for land is typically required for reliable detection and tracking of single-engine and twin-engine private aircraft. The required SCV for an ocean background is typically 10 dB higher because the ocean clutter typically averages 10 dB stronger than land clutter. Similar minimum SCVs are required for missile detection although the SCVs are also critically dependent on radio frequency because missiles and similar targets are highly resonant. In the absence of spread clutter, the SCV is proportional to transmitter power. Using antenna gains employed by modern OTHR systems, 20 kW is typically the lowest transmitter power used for general applications. On-line measurements of the SCV and other factors, such as the Doppler spread of clutter, enable the OTHR system 34 to continuously monitor performance and, when necessary, change operating frequency or move the coverage area to achieve acceptable performance.

Targets 56 are detected with "slant-space" parameters of round-trip time delay, azimuth, and Doppler shift. The automatic tracking system of the OTHR 34 associates and filters slant-space detections as a function of time to form smooth and independent tracks of the targets 56. The PMA function is utilized to convert the spatial parameters of each detection string in bistatic radar space to equivalent earth coordinates. The on-line ionospheric model derived from the soundings is used to resolve this geometry, thereby enabling the estimation of geographic position, course, and speed for each target. The earth-normalized (i.e., geographically positioned) tracks are updated and redisplayed during radar scanning, and these updates can be reported to a remote display terminal via discrete communication channels, as may be required by the radar user.

Traditional OTHR Processing

Figure 3:
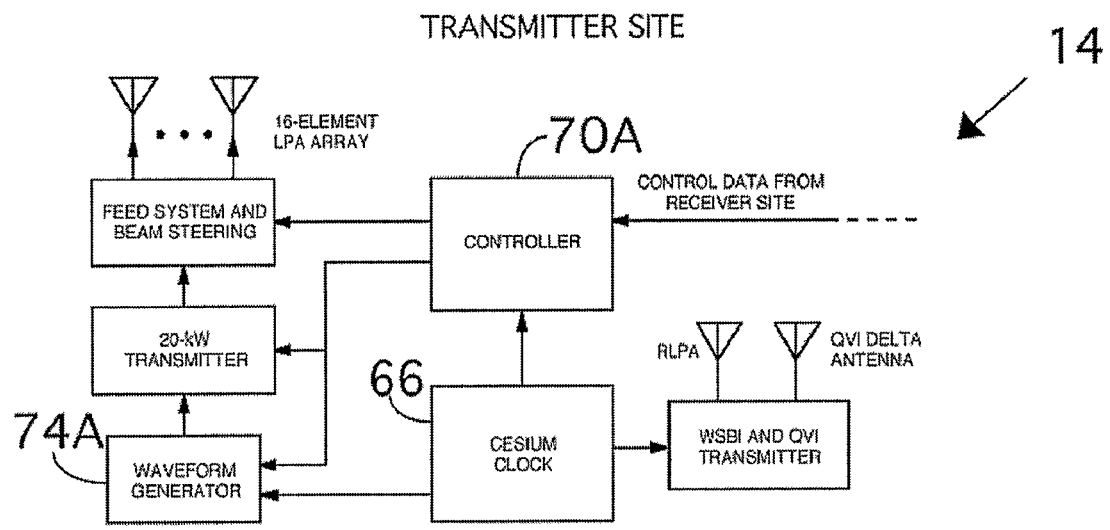
FIG. 3 is a functional block diagram depicting an exemplary conventional OTHR transmitter site.
Figure 4:
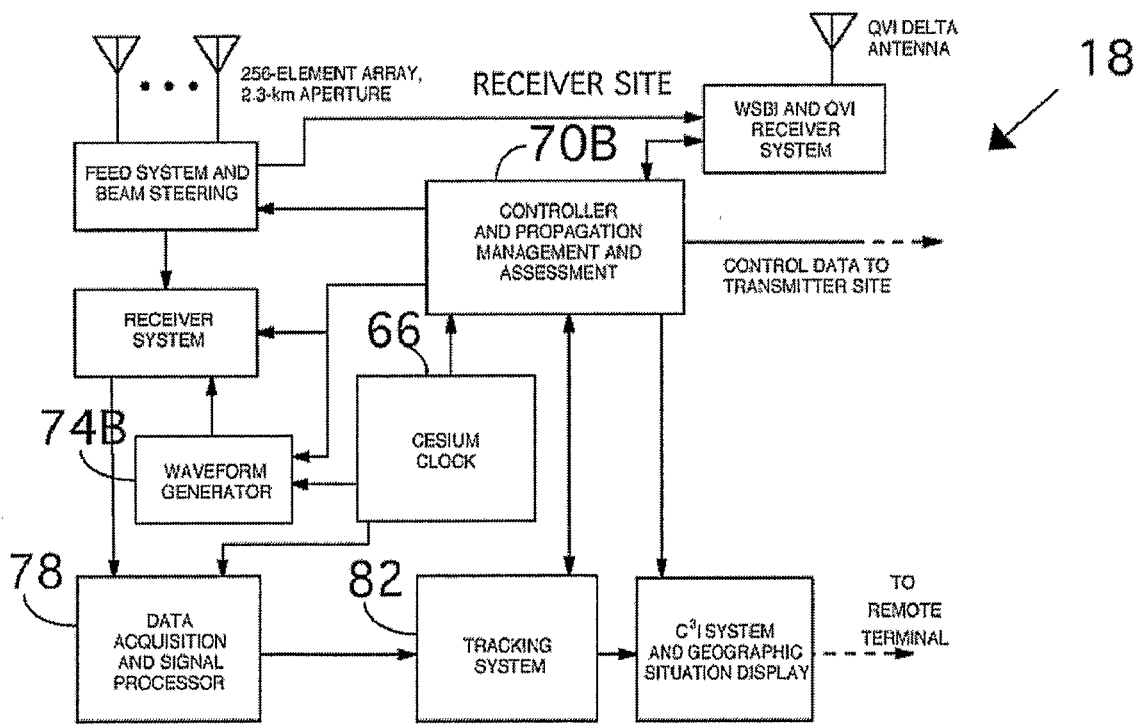
FIG. 4 is a functional block diagram depicting an exemplary conventional OTHR receiver site.

FIGS. 3 and 4 are functional block diagrams of the transmitter site 14 and receiver site 18 of an exemplary conventional OTHR control and processing system. The designations "A" and "B" signify aspects of subsystems common to both the transmitter site 14 and receiver site 18, respectively. Precise timing is ensured by the use of a Cesium clock 66, or in alternate embodiments by means of GPS slaved oscillators. Other significant components of the conventional architecture include the controller 70, waveform generator 74, data acquisition and signal processor 78, and tracking system 82. These components are specifically designed and implemented to detect and track a single target class at any one time. No capability is provided to track multiple target classes as contemplated according to the present invention.

Multiple Target Class Tracking

Figure 5:
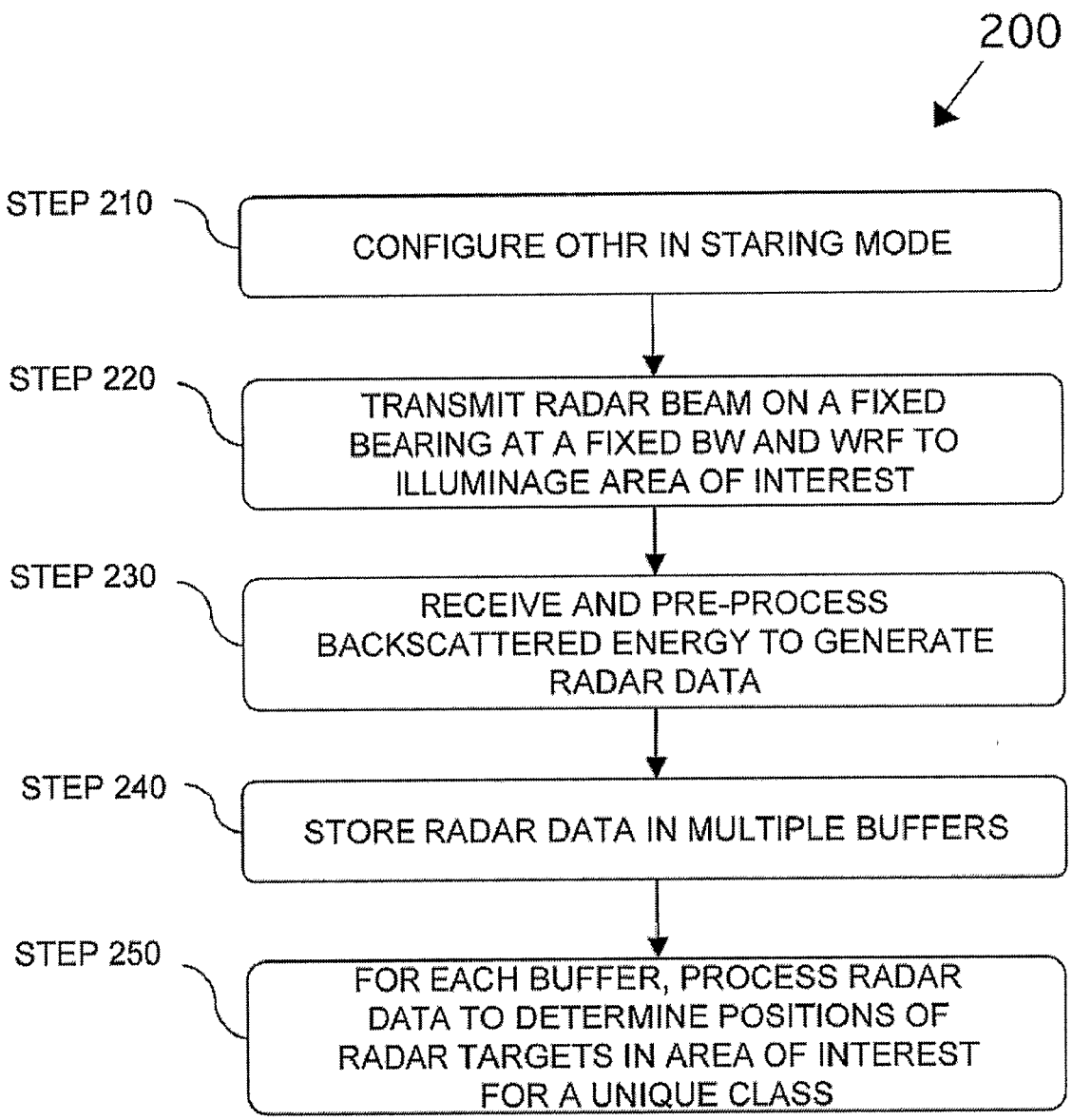
FIG. 5 is a flowchart representation of an embodiment of a method for detecting targets in a plurality of target classes in accordance with the invention.

FIG. 5 shows a flowchart representing an embodiment of a method 200 for detecting targets in a plurality of target classes in accordance with the invention. An OTHR is tasked (i.e., configured) (step 210) in a staring mode in which the transmit and receive radar beams are not scanned, but are fixed to illuminate a specific area of interest, or DIR. The DIR is preferentially of the order of 5,000 to 50,000 square nautical miles, depending on the width of the transmit beam, number of receive beams that are nested within the transmit beam, center range, target objective, and ionospheric conditions. The primary limiting factor in DIR size is not due to equipment, but the range depth achievable at a single radar operating frequency. Higher transmit power enables the use of a broader transmit beam to achieve the required effective radiated power (ERP) on the DIR. The ability to process a large number of receive finger beams is no longer limited by the size of digital processors, therefore generally any sized transmit beam can be filled with receive beams. A practical transmit beam width limit is 10 degrees, corresponding to a width of 210 nmi at 1200 nmi range. A typical range depth permitted by the ionosphere is 250 nmi, yielding a DIR maximum size of 52,500 square nmi. A target objective that demands single mode propagation through the ionosphere, such as small boat detection, can at times be limited to a 100 nmi range depth. The transmit radar beam illuminating the area of interest is transmitted (step 220) on a fixed bearing at a fixed bandwidth and a fixed WRF. Preferably, the frequency modulation waveform is nominally a frequency modulated continuous wave (FMCW) up-chirp waveform. Useful alternate waveform types for Doppler processing include FMCW down-chirp, FMCW triangle-chirp, simple pulse, phase-coded pulse, and linear-frequency-modulated pulse (i.e., interrupted FMCW).

The WRF is selected to be great enough to display Doppler shifts from fast targets and to allow for Doppler aliasing into adjacent range bins when necessary with minimal eclipsing loss when the Doppler shifts cross the clutter at multiples of the WRF. In one embodiment, a WRF of 30 Hz is used to achieve an unambiguous range of 5,000 km (2,700 nmi) to avoid unwanted ionospheric clutter. Slower targets generally have Doppler shifts less than 5 Hz, which is a subdivision of the unambiguous ±15 Hz normally displayed by the 30 Hz WRF.

The bandwidth should be sufficiently low to avoid radio frequency interference (RFI) caused by or imposed on other HF band users, however, the bandwidth should be sufficiently high to provide clutter cell reduction and useful target positioning accuracy. The bandwidth should not be great enough that targets would cross more than two range cells during a CIT. A bandwidth of 25 kHz, with an associated 3.2 nmi range per cell, enables a modest clutter reduction for slow targets and is generally realizable in the presence of RFI. Moreover, the range resolution does not smear faster targets during a CIT. Typical CITs for exemplary target classes are described according to target speed and acceleration as shown in Table 1.

TABLE 1

Exemplary Target Classes

| Target Speed | Target Acceleration | CIT/Advance |
| --- | --- | --- |
| 0-50 m/s | 0-0.1 g | 26 s/6.50 s advance |
| 50-500 m/s | 0-1 g | 2-8 s/1.00 s advance |
| 500-2000 m/s | 1-3 g | 2-4 s/0.50 s advance |
| Up to 8000 m/s | >3 g | 2 s/0.25 s advance |

The backscattered energy from the area of interest is received and pre-processed (step 230) to generate radar data. Pre-processing performed at the receiver site includes time-delay gating, de-chirping (i.e., demodulation of the FMCW waveform) and sampling using an analog-to-digital converter (ADC). The radar data generated by the pre-processing is stored (step 240) in multiple buffers for parallel channel processing. Each buffer receives the same radar data. In some embodiments, buffering the radar data involves copying the radar data from one buffer into one or more other buffers. Each buffer is dedicated to a particular target class. In an alternate embodiment, parallel processing is achieved using multiple pointers to a single buffer storing the radar data.

The radar data in each buffer is processed (step 250) independently in parallel channels for a respective target class. The fundamental differences amongst processing channels are the values of CIT and advance employed, as shown in Table 1. The processed radar data includes a list of temporary positions and instantaneous radial velocities for targets present in the area of interest. Processing can also include decimation in range and/or Doppler time domains if required, range-Doppler (RD) map generation, impulsive noise excision (INE), RD normalization, and automatic peak detection. In some embodiments, separate user displays are employed to present the processed radar data for each target class in Doppler specific formats.

In preferred embodiments, processing the buffered radar data also includes automatic tracking of detected target peaks in the area of interest. A multiple-hypothesis tracking (MHT) algorithm with Kalman filtering (see, e.g., Samuel S. Blackman, "*Multiple Hypotheses Tracking for Multiple Target Tracking*," IEEE A&E Systems Magazine, Vol. 19, No. 1, Part 2: Tutorials, January 2004) can be used, with unique target models and Kalman association parameters appropriate for each target class. For example, azimuthal wander due to traveling ionospheric disturbances can be carefully smoothed for ships and land vehicles, but less so for fast targets as significant cross-range velocity can be due to target motion. Some targets require a special Doppler acceleration allowance, such as missiles and aircraft during takeoff. The output of the automatic tracking process is preferentially displayed on a single geographic situation display.

Figure 6:
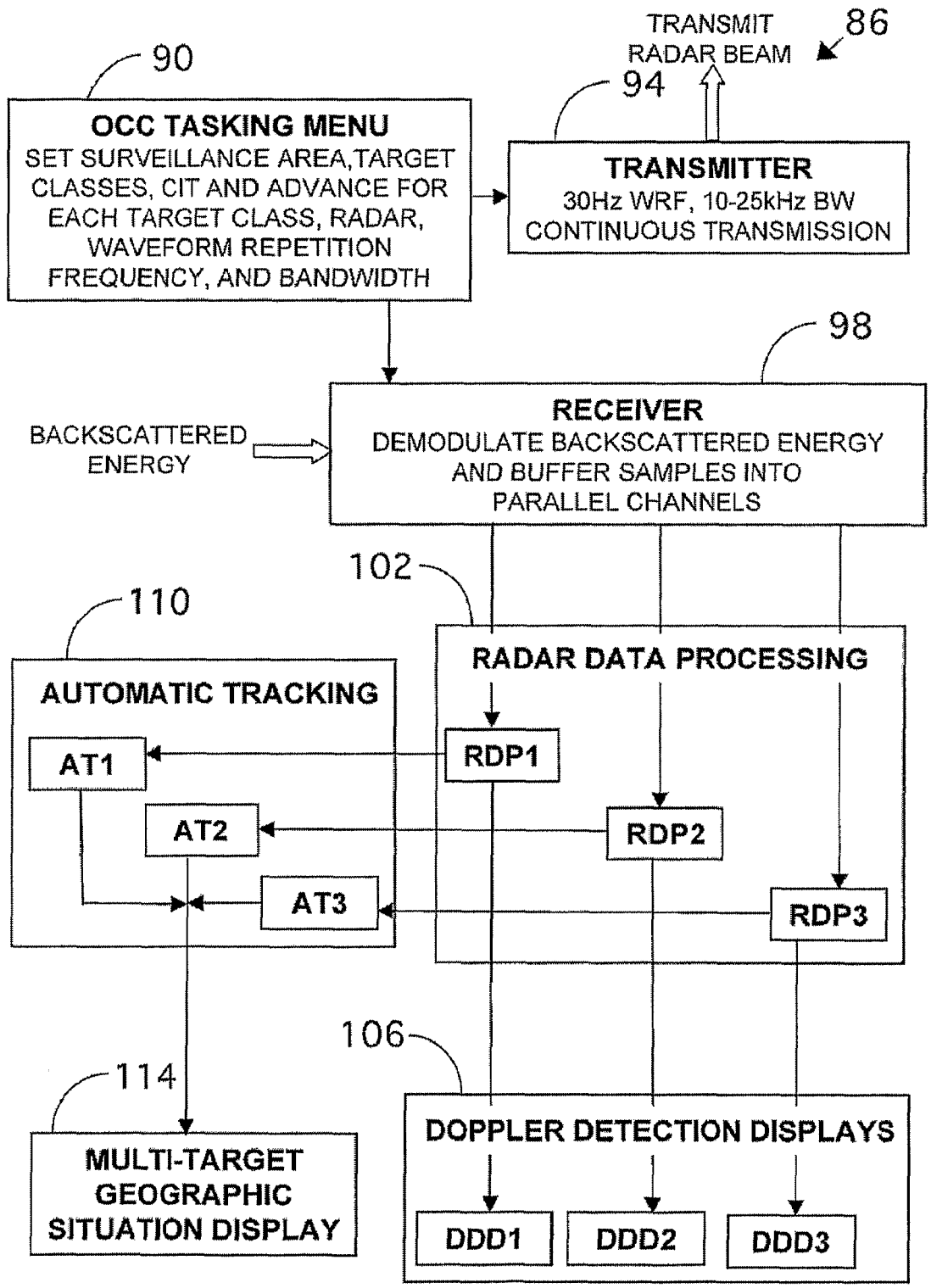
FIG. 6 is a schematic diagram of an over-the-horizon radar system for detecting and tracking targets in a plurality of target classes in accordance with the invention.

FIG. 6 depicts an OTHR system 86 for tracking targets in a plurality of target classes according to the present invention. The OTHR system 86 includes an OCC tasking menu 90, a transmitter 94, a receiver 98, radar data processing modules RDP1, RDP2 and RDP3 (generally 102), Doppler detection displays DDD1, DDD2 and DDD3 (generally 106), automatic tracking modules AT1, AT2 and AT3 (generally 110), and a multi-target geographic situation display 114. Although the OTHR system 86 is depicted to have three processing paths representing three different target classes, the figure should not be interpreted to limit the invention to three processing paths. Instead, it should be recognized that any number of processing paths greater than one is contemplated by the invention. It is further contemplated that the radar data processing modules 102 and the automatic tracking modules 110 can use either special purpose hardware, in which one device can be allocated per target class, or can use general purpose computing hardware having either a single processor or multiple processors. Preferred embodiments use general purpose computing elements with multiple processors contained therein to permit parallel processing of each target class.

The OCC tasking menu 90 allows the operator of the OTHR system 86 to input parameters for operation. Parameters include the number of target classes (limited according to the available processing hardware), the FMCW or pulse waveform parameters, and the CIT and advance for each class. Multi-class parameters such as the WRF and bandwidth are also entered. Additional information entered by the operator includes coordinates or similar information for aiming the transmit and receive radar beams to the area of interest.

The transmitter 94 receives the parameters from the OCC tasking menu, transmits the radar beam to the area of interest, and continuously illuminates the area of interest with the specified waveform. The receiver 98 receives and pre-processes radar backscattered energy from the DIR using time-delay gating, demodulation, and sampling with analog to digital conversion. Digital samples are then buffered into parallel processing channels with one channel designated for each target class. Three channels are depicted in the illustrated embodiment although any plurality of channels is contemplated by the present invention.

The radar data processing modules 102 are chosen according to the target classes defined from the OCC tasking menu. The processing implemented in each radar data processing module 102 can include decimation in range and/or Doppler time domains (if required), range-Doppler (RD) map generation, impulsive noise excision (INE), RD normalization, and automatic peak detection.

The processed data from the radar data processing modules 102 are provided to a plurality of Doppler detection displays 106. Preferentially, one Doppler detection display 106 is available for each target class, although alternate embodiments may omit one or more displays 106, or all the displays 106. In other embodiments, the Doppler detection displays 106 are replaced by other display types adapted to display raw target detection information for specific target classes. The processed data from the radar data processing modules 102 are also provided to the automatic tracking modules 110. A multiple-hypothesis tracking algorithm with Kalman filtering can be used with unique target models and Kalman association parameters appropriate for the target class corresponding to each automatic tracking module 110.

The output of the automatic tracking modules 110 is, in preferred embodiments, displayed on a single geographic situation display 114 used to plot target progress on a digital map. The multiple target class processing of the present invention enables accurate computation of intertarget vectors, as the ionospheric conditions are the same for each target. Previous target vectoring has suffered inaccuracy due to the sequential approach to radar operation, such as the use of long dwells for slow targets, interspersed with short dwells for air targets.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for detecting targets in a plurality of target classes, the method comprising:
    configuring an over-the-horizon radar in a staring mode to monitor an area of interest;
    transmitting a radar beam on a fixed bearing at a fixed bandwidth and a fixed waveform repetition frequency (WRF) to illuminate the area of interest;
    receiving and pre-processing radar backscattered energy from the area of interest to generate radar data;
    storing the radar data in a plurality of buffers; and
    processing the buffered radar data in parallel channels to determine positions of targets present in the area of interest, each channel corresponding to a respective one of the target classes.

2. The method of claim 1 wherein buffering the received radar data comprises buffering the received radar data in a first buffer and copying the received radar data in the first buffer into a second buffer.

3. The method of claim 1 wherein the fixed bandwidth and the fixed WRF are selected in response to at least one of anticipated target Doppler shifts, ionosphere characteristics, radio frequency interference, earth and ionospheric Doppler-spread clutter magnitude, and required target position accuracies.

4. The method of claim 1 wherein the area of interest comprises a dwell illuminated region.

5. The method of claim 1 further comprising displaying the processed radar data from each of the parallel channels on a respective one of a plurality of detection displays.

6. The method of claim 1 wherein processing the buffered radar data in parallel channels comprises separately automatically detecting and tracking, for each of the target classes, the positions of targets in the area of interest.

7. The method of claim 6 further comprising displaying the target position and progress for targets in at least two of the target classes in the area of interest.

8. An over-the-horizon radar system for detecting and tracking targets in a plurality of target classes, comprising:
   a transmitter to illuminate an area of interest;
   a receiver having a plurality of receive beams to detect backscattered energy from the area of interest, the receiver pre-processing the detected backscattered energy to generate pre-processed radar data;
   a plurality of buffers in communication with the receiver, each buffer adapted to store the pre-processed radar data; and
   a plurality of processors each in communication with a respective one of the buffers, each processor adapted to process the pre-processed radar data for a respective one of the target classes and provide class-specific target data.

9. The over-the-horizon radar system of claim 8 further comprising a plurality of detection displays each in communication with a respective one of the processors.

10. The over-the-horizon radar system of claim 8 further comprising a plurality of automatic detection and tracking modules each in communication with a respective one of the processors, each automatic detection and tracking module being configured for tracking targets in a respective target class.

11. The over-the-horizon radar system of claim 10 further comprising a geographic situation display in communication with each of the automatic tracking modules and adapted to display target position and progress for targets defined in the target classes.

12. A computer program product for detecting targets in a plurality of target classes, the computer program product comprising a computer useable medium having embodied therein program code comprising:
   program code for pre-processing radar energy from an area of interest and generating radar data in response thereto, the radar energy being backscattered energy from an illumination of the area of interest by an over-the-horizon radar beam having a fixed bandwidth and a fixed WRF;
   program code for storing the radar data in a plurality of buffers; and
   program code for simultaneously processing the buffered radar data in parallel channels to determine positions of targets present in the area of interest, each channel corresponding to a respective one of the target classes.

13. The computer program product of claim 12 wherein the program code for simultaneously processing the buffered data in parallel channels comprises a plurality of program code modules adapted for simultaneous execution, each program code module comprising program code for processing the buffered radar data in a respective buffer to determine positions of targets present in the area of interest for a respective one of the target classes.

14. The computer program product of claim 12 further comprising program code for displaying the processed radar data from each of the parallel channels on a respective one of a plurality of detection displays.

15. The computer program product of claim 12 wherein the program code for simultaneously processing the buffered radar data in parallel channels comprises program code for separately automatically detecting and tracking, for each of the target classes, the determined target positions of targets in the area of interest.

16. The computer program product of claim 15 further comprising program code for displaying the target position and progress for targets in at least two of the target classes in the area of interest.

* * * * *